United States Patent [19]

Albizzati et al.

[11] Patent Number: 5,084,540
[45] Date of Patent: Jan. 28, 1992

[54] ETHYLENE/BUTENE-1 COPOLYMERS

[75] Inventors: Enrico Albizzati, Arona; Umberto Zucchini, Ferrara; Arrigo Soverini, Novara; Illaro Cuffiani, Ferrara, all of Italy

[73] Assignee: Montedison S.p.A., Milan, Italy

[21] Appl. No.: 616,767

[22] Filed: Nov. 20, 1990

Related U.S. Application Data

[63] Continuation of Ser. No. 378,484, Jul. 12, 1989, abandoned, which is a continuation of Ser. No. 28,013, Mar. 18, 1987, abandoned, which is a continuation of Ser. No. 874,781, Jun. 12, 1986, abandoned, which is a continuation of Ser. No. 795,747, Nov. 7, 1985, abandoned, which is a continuation of Ser. No. 665,085, Oct. 26, 1984, abandoned, which is a continuation of Ser. No. 198,592, Oct. 20, 1980, abandoned, which is a continuation of Ser. No. 62,625, Aug. 1, 1979, abandoned.

[30] Foreign Application Priority Data

Aug. 2, 1978 [IT] Italy .............................. 26398 A/78

[51] Int. Cl.$^5$ .............................................. C08F 210/16
[52] U.S. Cl. .................................. 526/348.6; 526/125
[58] Field of Search ........................................ 520/348.6

[56] References Cited

U.S. PATENT DOCUMENTS

| | | | |
|---|---|---|---|
| 3,645,992 | 2/1972 | Elston | 526/348.6 |
| 3,901,863 | 8/1975 | Berger et al. | 526/124 |
| 3,920,621 | 11/1975 | Baxmann et al. | 526/348.6 |
| 3,981,849 | 9/1976 | Frese et al. | 526/348.6 |
| 4,089,808 | 5/1978 | Zucchini et al. | 526/125 |
| 4,243,619 | 1/1981 | Fraser et al. | 526/348.6 |

FOREIGN PATENT DOCUMENTS 1150814 5/1969 United Kingdom .
1355245 6/1974 United Kingdom .

*Primary Examiner*—Edward J. Smith
*Attorney, Agent, or Firm*—Stevens, Davis, Miller & Mosher

[57] ABSTRACT

Crystalline copolymers of ethylene and alpha-olefins $CH_2=CHR$ in which R is an alkyl group having 2 to 8 carbon atoms, containing 0.5 to 3% by moles of polymerized alpha-olefin and having a density lower than 0.945 g/cc are obtained by polymerizing, in the gas phase, mixtures of ethylene and the alpha-olefins in contact with catalysts prepared from (1) Ti compounds supported on Mg halides and (2) organometallic compounds, which are active in the polymerization of ethylene but exhibit little, if any, activity in the homo- or copolymerization of the alpha-olefins.

4 Claims, No Drawings

ETHYLENE/BUTENE-1 COPOLYMERS

This application is a continuation of application Ser. No. 378,484, filed July 12, 1989, which is a continuation of application Ser. No. 028,013, filed Mar. 18, 1987, which in turn is a continuation of application Ser. No. 874,781, filed June 12, 1986, which in turn is a continuation of application Ser. No. 795,747, filed Nov. 7, 1985, which in turn is a continuation of application Ser. No. 665,085, filed Oct. 26, 1984, which in turn is a continuation of application Ser. No. 198,592, filed Oct. 20, 1980, which in turn is a continuation of application Ser. No. 062,625, filed Aug. 1, 1979, all now abandoned.

BACKGROUND OF THE INVENTION

Low and mean density polyethylenes (values generally lower than 0.945) obtained by low pressure polymerization processes in which ethylene is polymerized in admixture with an alpha-olefin, in particular propylene or butene, in the presence of Ziegler-type catalysts or of catalysts based on silica-supported oxides, are already known.

The amount of polymerized alpha-olefin contained in those polymers generally ranges from 1 to 15% by moles. The ratio between the molar percentage of alpha-olefin and the polymer density generally is not lower than 5-6 for density values equal to about 0.910.

A high content of alpha-olefin in the polyethylene chain on one side contributes to a lowering of the polymer density and, on the other side, adversely effects all the mechanical properties of said polymer.

Thus, there has been a need for polymers which, for a given density, have a minimum content of alpha-olefins.

Copolymers endowed with said characteristics (low density and simultaneously low content of alpha-olefin) are described in Canadian Patent No. 849,081. Those copolymers, however, are characterized by a relatively low melting point, comprised between about 122° and 102° C. for density values decreasing from about 0.930 to 0.910 g/cc. In the field of the copolymers which, for a given density, have a low content of alpha-olefin, it is desirable for insuring good mechanical properties, that the polymer melting point be as high as possible.

THE PRESENT INVENTION

One object of this invention is to provide new low-density copolymers of ethylene and the alpha-olefins containing a small amount of the polymerized alpha-olefin, having a high melting point and excellent mechanical properties.

That and other objects are achieved by the present invention in accordance with which it has been found, surprisingly, that it is possible to prepare crystalline copolymers of ethylene with alpha-olefins $CH_2=CHR$, wherein R is an alkyl radical with 2 to 8 C, having a density below 0.945 g/cc, in particular ranging from 0.915 to 0.930 g/cc, containing 0.5 to 3% by moles of polymerized alpha-olefin. In these copolymers, the ratio between molar percentage of alpha-olefin and polymer density reaches, at the most, a value of 3.5 when the density values are approximately equal to 0.910 and decreases to values of about 0.5 for density values around 0.945. The melting point of the copolymers is comprised between 110° and 130° C., and increases as the density increases.

For a given density and a given content of alpha-olefin, the copolymers of the present invention are therefore characterized, as compared to the polymers known so far, by a higher melting point. That results in better mechanical properties and in particular better tenacity.

Another characterizing feature which differentiates the present copolymers from those known heretofore consists in that the number of methyl groups per 100 Cs is almost equal to the number of radicals deriving from the alpha-olefin.

For a given content of alpha-olefin the density of the copolymers varies according to the melt index of the copolymer (determined according to standard ASTM 1238 cond. E).

However, the corrections in respect of the density of the copolymer having a melt index equal to 1 are relatively small, as they refer only to the third decimal figure. The melt index is respectively decreased or increased depending on if it is higher or lower than 1.

For a copolymer containing 2% by moles of butene, the density is 0.922 when the melt index is 0.03, and it is 0.933 when the melt index is 50, while the density is 0.9265 when the melt index is 1.

The relatively low values of the ratio between polymerized alpha-olefin and density and, at the same time, the high melting point bring about particularly high mechanical properties in articles made of the copolymers, e.g., films.

In particular, the films exhibit a high impact strength and, contemporaneously, a high tensile strength.

The polymers are prepared by polymerizing in the gas phase, in a fluid bed or in a stirred reactor, mixtures of ethylene and of alpha-olefin $CH_2=CHR$, in which R has the meaning indicated hereinabove, in particular butene, with catalysts prepared from Ti compounds supported on Mg halides and from organometallic Al compounds, which are active in the polymerization of ethylene, but little or not at all active in the homopolymerization of the alpha-olefins.

The catalysts consist, in particular, of the reaction product of:

(A) an Al-alkyl compound, in particular an Al-trialkyl such as $Al(C_2H_5)_3$, $Al(i-C_4E_9)_3$ or a dihalide of Al-alkyl, with (B) the solid product of the reaction between:
  (a) a tetravalnet Ti-alcoholate comprising at least a Ti-OR bond in which R is an alkyl, aryl or cycloalkyl radical with 1 to 18 C, and a complex between:
  (b) a compound $X_nMg(OR)_{2-n}$ in which X is a halogen, R has the meaning specified in (a) $0 \leq n \leq 2$, and
  (c) an Al halide of formula $X_2AlR$ in which X and R have the meanings indicated above and R, furthermore, may be, also, a group $CR'$ in which R' has the same meaning indicated hereinabove for R.

In particular, component (B) is the product of the reaction of an adduct between a Mg dihalide and a dihalide of Al-alkyl with a Ti compound of the type specified above.

The preferred Ti compounds are the Ti tetraalcoholates. Examples of representative compounds are $Ti(O-n-C_4H_9)_4$ and $Ti(O-n-C_3H_7)_4$. Examples of other useful Ti compounds include: $Ti(O-n-C_3H_7)_2Cl_2$, $Ti(O-n-C_3H_7)_2Cl_2$, $Ti(O-n-C_4H_9)_2Cl_2$, $Ti(O-n-C_4H_9)_3Cl$.

Mg dihalides, for example $MgCl_2$, or a Mg dialcoholate are employed in particular as compound (b).

If a Mg dihalide is utilized, the compound is dissolved in a dihalide of Al-alkyl in amounts equal to 4-6 moles in respect to the Mg halide, operating at temperatures high enough to cause the dissolution (80°-100° C.).

The solution is then reacted with the Ti alcoholate; in this case a catalyst component (B) is obtained the particles of which have sizes ranging from about 10 to 30μ, and which results in a polymer in the form of particles having sizes ranging from about 100 to 500μ.

Catalysts of this type, which permit control of the polymer granulometry, are preferably utilized.

It is also possible to employ, with analogous results, the catalysts described in German Patent application No. P 2,822,809.

The preferred polymerization technique is the one of the fluid bed. The polymerization is carried out at pressures lower than 50 atm. and at temperatures lower than the softening point of the polymer and generally ranging from 50° to 110° C. Ethylene is fed in such ratio to the alpha-olefin as to obtain a polymer having the desired density. The polymerized alphaolefin corresponds to about 1/10th of the amount contained in the feeding mixture. The molecular weight regulation is effected according to known methods, for example with hydrogen.

The following examples are given to illustrate the present invention in more detail and are not intended as limiting.

The melting point is determined according to the method described in Canadian Patent No. 849,081.

EXAMPLE 1

(a) Preparation of the catalyst 95 g of anhydrous $MgCl_2$ were dissolved at 120° C. in 4.5 moles of $Al(C_2H_5)Cl_2$, and the solution was poured into a solution of Ti-tetrabutylate dissolved in hexane. The Ti/Mg ratio was equal to 3. The solid product so obtained was filtered and repeatedly washed with hexane and dried. The dried solid, subjected to analysis, gave the following results:

Ti = 17% by weight
Mg = 2.5% by weight.

(b) Polymerization

Operation was in the gas phase in a cylindrical steel reactor having a volume of about 8 l and a truncated coneshaped bottom, inserted in a circuit in which the gas was recirculated by means of a diaphragm compressor. The reactor was of the spouted bed type and the gas feeding it was in such amount as to obtain, on the bottom of the inlet duct, a speed of about 2 m/sec. The make-up gases ($C_2^-$, $H_2$, butene-1, $N_2$) were fed after treatment on molecular sieves.

The catalytic system, prepared every 8 hours, was dispersed in n-heptane at a concentration of 0.6 g of solid/h, maintaining an Al/Ti molar ratio equal to 100. The system was prepared by mixing the catalyst component as prepared under (a) with Al-triisobutyl dissolved in heptane. The suspension was fed to the reactor batchwise, every 10 minutes, using a vessel with a few ml. capacity, in which the suspension was dosed and from which it was then sent into the polymer bed by means of a pure nitrogen pressure.

The catalyst feed (about 2 mg/h of Ti) and the gas capacity (entering at an average temperature of 70° C.) to the reactor were adjusted in order to keep the polymerization temperature around 95° C. Under these conditions, it was possible to obtain an average production of about 150 g of polymer/h with an average residence time of the catalyst of 3.5 h.

The concentrations of the individual components in the circulating gas were as follows:

|  | % by vol |
|---|---|
| butene-1 | 10 |
| hydrogen | 1 |
| ethylene | 88-85 |
| nitrogen | 2-5 |

Under these conditions and operating at a pressure of 20 atm. it was possible to obtain polymerization yields of about 70 kg of polymer/g of Ti and a product having the following characteristics:

| density | 0.931 g/ml |
|---|---|
| $C_4$ content | 1.4 % by weight |
| $CH_3$/100 C number | 0.35 |
| $C_2H_5$/100 C number | 0.35 |
| melt index | 0.12 g/10 min. |
| melting point | 127° C. |
| bulk density | 0.49 g/ml. |

EXAMPLE 2

The apparatus modalities described in Example 1 were used, varying only the concentration by volume of butene-1, in the gas composition and which, in this run, was kept at 18%.

A polymerization yield like the one indicated in Example 1, (70 kg of polymer/g of Ti), and a product having the following characteristics were obtained:

| density | 0.9268 g/ml |
|---|---|
| $C_4$ content | 2.7 % by weight |
| $CH_3$/100 C number | 0.7 |
| $C_2H_5$/100 C number | 0.7 |
| melt index | 0.16 g/10 min. |
| melting point | 125° C. |
| bulk density | 0.49 g/ml. |

EXAMPLE 3

The apparatus and modalities of Example 1 were used except that the concentration of butene-1, hydrogen and nitrogen were different being maintained, in this run, at 14% for butene-1, 9% for hydrogen, and 5-10% for nitrogen.

A polymerization yield as in Example 1, (70 kg of polymer/g of Ti), and a product with the following characteristics were obtained:

| density | 0.921 g/ml |
|---|---|
| $C_4$ content | 4.52 % by weight |
| $CH_3$/100 C number | 1.15 |
| $C_2H_5$/100 C number | 1.15 |
| melt index | 0.5 g/10 min. |
| melting point | 121.5° C. |
| bulk density | 0.49 g/ml. |

A film obtained by blow-molding this polymer and having a thickness of 140-158 mm, exhibited the following characteristics:

| resistance to double folding at 23° C. | >50,000 |
|---|---|
| δ = 500 g (ASTM D 2176) | |

| -continued | |
|---|---|
| bursting strength at 23°C. (ASTM D 74) tensile strength at 23°c. ds/dt = 1 cm/min. (ASTM D 1238 cond. E) | >2.9 kg/cm² |
| δy (parallel-transversal) (kd/cm²) | 124-126 |
| δB (parallel-transveral) (kg/cm²) | 306-334 |
| εy (parallel-transversal) (%) | 13.4-12.6 |
| εB (parallel-transversal) (%) | 1060-1100 |

What we claim is:

1. Crystalline copolymers of ethylene with butene-1 having a density between 0.910 and 0.945 g/cc, and a butene-1 content of 0.5 to 3% by moles selected from the group consisting of:
   a) a crystalline copolymer having a density of 0.945, a ratio R between the molar percentage of butene-1 and polymer density of 0.5, and a melting point of 130° C.;
   b) a crystalline copolymer having a density of 0.931, a ratio R between the molar percentage of butene-1 and polymer density of 0.8, and a melting point of 127° C.;
   c) a crystalline copolymer having a density of 0.9268, a ratio R between the molar percentage of butene-1 and polymer density of 1.5, and a melting point of 125° C.;
   d) a crystalline copolymer having a density of 0.921, a ratio R between the molar percentage of butene-1 and polymer density of 2.5, and a melting point of 121.5° C.; and
   e) a crystalline copolymer having a density of 0.910, a ratio R between the molar percentage of butene-1 and polymer density of 3.5, and a melting point of 110° C.

2. A crystalline copolymer of ethylene with butene-1 having a density of 0.931, a ratio R between the molar percentage of butene-1 and polymer density of 0.8, and a melting point of 127° C.

3. A crystalline copolymer of ethylene with butene-1 having a density of 0.9268, a ratio R between the molar percentage of butene-1 and polymer density of 1.5, and a melting point of 125° C.

4. A crystalline copolymer of ethylene with butene-1 having a density of 0.921, a ratio R between the molar percentage of butene-1 and polymer density of 2.5, and a melting point of 121.5° C.

* * * * *